United States Patent
Iizuka et al.

(10) Patent No.: US 9,879,687 B2
(45) Date of Patent: Jan. 30, 2018

(54) VARIABLE GEOMETRY SYSTEM TURBOCHARGER AND METHOD OF MANUFACTURING HOUSING FOR VARIABLE GEOMETRY SYSTEM TURBOCHARGER

(71) Applicant: IHI Corporation, Koto-ku (JP)

(72) Inventors: Kuniaki Iizuka, Tokyo (JP); Yoshinari Yoshida, Tokyo (JP); Yasushi Asada, Tokyo (JP); Osamu Kagimoto, Tokyo (JP); Hideumi Ohkuma, Tokyo (JP); Yohei Suruga, Tokyo (JP); Suguru Katayama, Tokyo (JP); Toshihiko Kitazawa, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/588,508

(22) Filed: Jan. 2, 2015

(65) Prior Publication Data

US 2015/0122233 A1 May 7, 2015

Related U.S. Application Data

(63) Continuation of application No. PCT/JP2013/074332, filed on Sep. 10, 2013.

(30) Foreign Application Priority Data

Sep. 18, 2012 (JP) .................................. 2012-204011

(51) Int. Cl.
*F04D 27/00* (2006.01)
*F02B 37/24* (2006.01)
(Continued)

(52) U.S. Cl.
CPC ............ *F04D 27/002* (2013.01); *B23P 19/04* (2013.01); *F01D 9/026* (2013.01); *F01D 17/165* (2013.01);
(Continued)

(58) Field of Classification Search
CPC ...... F04D 27/002; F04D 25/045; B23P 19/04; F01D 9/026; F01D 25/24; F01D 17/165; F02B 37/24
(Continued)

(56) References Cited

U.S. PATENT DOCUMENTS

| 6,224,333 B1 * | 5/2001 | Loeffler ................ F01D 17/143 29/889.1 |
| 2009/0092483 A1 * | 4/2009 | Yasui .................... F01D 17/165 415/159 |

FOREIGN PATENT DOCUMENTS

| CN | 101415920 A | 4/2009 |
| JP | 63-306801 | 12/1988 |

(Continued)

OTHER PUBLICATIONS

International Search Report issued Oct. 8, 2013 for PCT/JP2013/074332 filed on Sep. 10, 2013 with English Translation.

(Continued)

*Primary Examiner* — Jason Shanske
*Assistant Examiner* — Jason T Newton
(74) *Attorney, Agent, or Firm* — Oblon, McClelland, Maier & Neustadt, L.L.P.

(57) ABSTRACT

A reservoir groove for storing condensate water is formed on a lower part side of a link chamber inside a turbine housing. The reservoir groove is formed such that, assuming that water vapor contained in an exhaust gas retained inside the link chamber is completely condensed and liquefied after an engine stops its operation, a height position of a reference water surface of the condensate water stored in a reservoir area, which includes a space inside the reservoir groove in the link chamber, is lower than a height position of a lowermost part of the link mechanism.

10 Claims, 5 Drawing Sheets

(51) Int. Cl.
  *F01D 17/16* (2006.01)
  *F01D 25/24* (2006.01)
  *F01D 9/02* (2006.01)
  *B23P 19/04* (2006.01)
  *F04D 25/04* (2006.01)

(52) U.S. Cl.
  CPC .............. *F01D 25/24* (2013.01); *F02B 37/24* (2013.01); *F04D 25/045* (2013.01); *F05D 2220/40* (2013.01); *F05D 2250/294* (2013.01); *F05D 2260/602* (2013.01); *F05D 2260/608* (2013.01); *Y02T 10/144* (2013.01); *Y10T 29/49245* (2015.01)

(58) Field of Classification Search
  USPC .......................................................... 60/602
  See application file for complete search history.

(56) References Cited

FOREIGN PATENT DOCUMENTS

| | | | | |
|---|---|---|---|---|
| JP | 2001-234753 | | 8/2001 | |
| JP | 2008-208787 A1 | | 9/2008 | |
| JP | 2009-074492 A1 | | 4/2009 | |
| JP | 2009-180110 A1 | | 8/2009 | |
| JP | 2009-180111 A1 | | 8/2009 | |
| JP | 2009180110 A | * | 8/2009 | .............. F02B 37/24 |
| JP | 2009-228450 A1 | | 10/2009 | |
| JP | 2009228450 A | * | 10/2009 | .............. F02B 37/24 |
| JP | 2010-071142 A1 | | 4/2010 | |
| JP | 2012-102660 A1 | | 5/2012 | |
| JP | 2012102660 A | * | 5/2012 | .............. F02B 37/24 |
| JP | 2013-199858 A | | 10/2013 | |

OTHER PUBLICATIONS

Written Opinion issued Oct. 8, 2013 for PCT/JP2013/074332 filed on Sep. 10, 2013.
U.S. Appl. No. 14/589,316, filed Jan. 5, 2015, Iizuka, et al.
Combined Chinese Office Action and Search Report issued on May 5, 2016 in Patent Application No. 201380037535.X (with English language translation of categories of cited documents).
Office Action issued Jan. 26, 2016 in Japanese Patent Application No. 2014-536766 (w/ English Translation).
Decision to Grant a Patent issued in Japanese Application No. 2014-536766 on Mar. 14. 2017.

* cited by examiner

VARIABLE GEOMETRY SYSTEM TURBOCHARGER AND METHOD OF MANUFACTURING HOUSING FOR VARIABLE GEOMETRY SYSTEM TURBOCHARGER

CROSS REFERENCE TO RELATED APPLICATIONS

This application is a continuation application of International Application No. PCT/JP2013/074332, filed on Sep. 10, 2013, which claims priority to Japanese Patent Application No. 2012-204011, filed on Sep. 18, 2012, the entire contents of which are incorporated by references herein.

BACKGROUND OF THE INVENTION

1. Field of the Invention

The present invention relates to a variable geometry system turbocharger equipped with a variable nozzle unit that can change a passage area for (a flow rate of) an exhaust gas to be supplied to a turbine impeller, and a method of manufacturing a housing for a variable geometry system turbocharger.

2. Description of the Related Art

In recent years, various developments have been made on a variable nozzle unit to be installed in a variable geometry system turbocharger. A general configuration of a variable nozzle unit is as described below.

Inside a turbocharger housing of a variable geometry system turbocharger, a base ring is provided concentrically with a turbine impeller. Multiple support holes are formed in the base ring at regular intervals in its circumferential direction to penetrate the base ring. Moreover, multiple variable nozzles are disposed on the base ring at regular intervals in its circumferential direction in such a way as to surround the turbine impeller. Each variable nozzle is rotatable about its shaft center which is parallel to the shaft center of the turbine impeller. Moreover, a nozzle shaft is formed integrally with a side surface of each variable nozzle on one side in the axial direction of the turbine impeller. Each nozzle shaft is rotatably supported by the corresponding support hole in the base ring.

A link mechanism for synchronously rotating the multiple variable nozzles is disposed in an annular link chamber that is defined on the one side in the axial direction of the base ring inside the turbocharger housing. The link mechanism is connected to and interlocks with the nozzle shafts of the multiple variable nozzles. When the multiple variable nozzles are synchronously rotated in a forward direction (an opening direction), a passage area for an exhaust gas to be supplied to the turbine impeller side is increased. On the other hand, when the multiple variable nozzles are synchronously rotated in a reverse direction (a closing direction), the passage area for the exhaust gas is decreased.

In general, the exhaust gas contains water vapor. When the engine stops its operation, the exhaust gas containing the water vapor is retained in the link chamber. Accordingly, when the variable geometry system turbocharger is used in cold weather, the water vapor is condensed (liquefied) and frozen inside the link chamber. If part of the link mechanism is immersed in the condensate water when the water gets frozen, the link mechanism will not operate smoothly when the engine resumes its operation. In other words, the freezing of the condensate water poses a problem for the operation of the variable nozzle unit. A variable geometry system turbocharger described in Japanese Patent Application Laid-Open Publication No. 2012-102660 (JP 2012-102660A) discloses a configuration for overcoming such a problem.

SUMMARY OF THE INVENTION

In the variable geometry system turbocharger of JP 2012-102660A, the accumulated water in the link chamber is drained from a drainage hole that communicates with the link chamber. The drainage hole is usually closed with a drainage bolt. In other words, drainage maintenance for draining the accumulated water each time requires work to take the drainage bolt out of the drainage hole and to attach the drainage bolt again. In addition, this variable geometry system turbocharger requires a dedicated component such as the drainage bolt used for the drainage of the accumulated water, and therefore has a complicated configuration.

An object of the present invention is to provide a variable geometry system turbocharger, which is capable of facilitating maintenance by making drainage inside a link chamber unnecessary.

A first aspect of the present invention is a variable geometry system turbocharger configured to supercharge air to be supplied to an engine by using pressure energy of an exhaust gas from the engine. Its gist is as follows. The variable geometry system turbocharger includes: a housing including a link chamber formed on one side in an axial direction of a turbine impeller, and rotatably housing the turbine impeller; and a variable nozzle unit being disposed inside the housing, and being capable of changing a passage area for the exhaust gas to be supplied to the turbine impeller. The variable nozzle unit includes: a base ring provided inside the housing concentrically with the turbine impeller, and having multiple support holes formed to penetrate the base ring and arranged in its circumferential direction; multiple variable nozzles disposed on the base ring and arranged in its circumferential direction in such a way as to surround the turbine impeller, each variable nozzle being rotatable about a shaft center which is parallel to a shaft center of the turbine impeller, each variable nozzle having a nozzle shaft formed integrally with a side surface of the variable nozzle on one side in the axial direction of the turbine impeller, and each variable nozzle rotatably supported by the corresponding support hole in the base ring; and a link mechanism disposed in the link chamber, connected to the nozzle shafts of the multiple variable nozzles, and configured to synchronously rotate the multiple variable nozzles. The link chamber includes: an inner surface forming the link chamber; a reservoir recess formed by cutting the inner wall on a lower part side of the link chamber; and a reservoir area including a space inside the reservoir recess, and designed to store condensate water on the lower part side of the link chamber. The reservoir recess is formed such that, assuming that water vapor contained in the exhaust gas retained inside the link chamber is completely condensed and liquefied after the engine stops its operation, a height position of a reference water surface of the condensate water stored in the reservoir area is lower than a height position of a lowermost part of the link mechanism.

A second aspect of the present invention is a method of manufacturing a housing for a variable geometry system turbocharger being configured to supercharge air to be supplied to an engine by using pressure energy of an exhaust gas from the engine, and including: a variable nozzle unit being capable of changing a passage area for the exhaust gas to be supplied to a turbine impeller; and a housing rotatably housing a turbine impeller, and having a link chamber formed on one side in an axial direction of the turbine impeller, the link chamber housing a link mechanism configured to synchronously rotate multiple variable nozzles in the variable nozzle unit, and the link chamber having an inner surface forming the link chamber. Its gist is as follows. The method includes forming a reservoir recess by cutting the inner wall on a lower part side of the link chamber, the reservoir recess defining an inside space included in a reservoir area designed to store condensate water. The reservoir recess is formed such that, assuming that water vapor contained in the exhaust gas retained inside the link chamber is completely condensed and liquefied after the engine stops its operation, a height position of a reference water surface of the condensate water stored in the reservoir area becomes lower than a height position of a lowermost part of the link mechanism.

Here, in the description and claims of this application, the term "provided" means: being provided directly; and being provided indirectly through another member. The term "disposed" means: being disposed directly; and being disposed indirectly through another member. Meanwhile, the expression "disposed on the base ring at regular intervals in their circumferential direction in such a way as to surround the turbine impeller" means being disposed between a pair of the base rings, which are located away from and opposed to each other in the axial direction, at regular intervals in their circumferential direction in such a way as to surround the turbine impeller. In addition, the term "lower part" means a lower position of the variable geometry system turbocharger in a state of being mounted on a vehicle or the like. The term "lowermost part" means the lowermost position of the variable geometry system turbocharger in the state of being mounted on the vehicle or the like. The meaning of the term "reservoir recess" includes an arc-shaped reservoir groove and a bottomed reservoir hole.

According to the present invention, it is possible to provide a variable geometry system turbocharger, which is capable of facilitating maintenance by making drainage inside a link chamber unnecessary.

DESCRIPTION OF THE PREFERRED EMBODIMENTS

Figure 1:
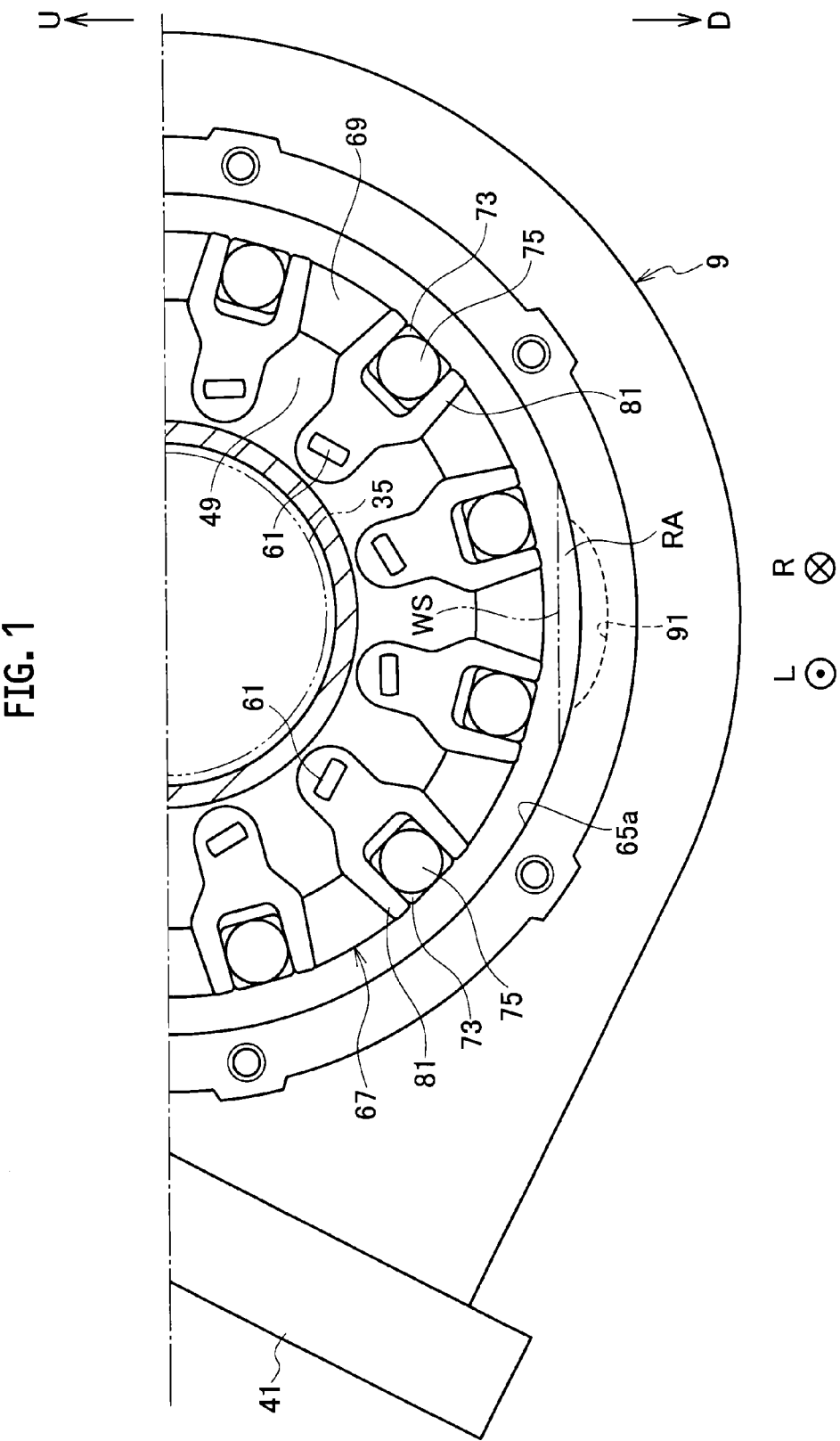
FIG. 1 is a view of a portion taken along the I-I line in FIG. 2.

An embodiment of the present invention will be described with reference to FIG. 1 to FIG. 5. Here, as shown in the drawings, "L" means a left-hand direction, "R" means a right-hand direction, "U" means an upward direction, and "D" means a downward direction, respectively.

Figure 3:
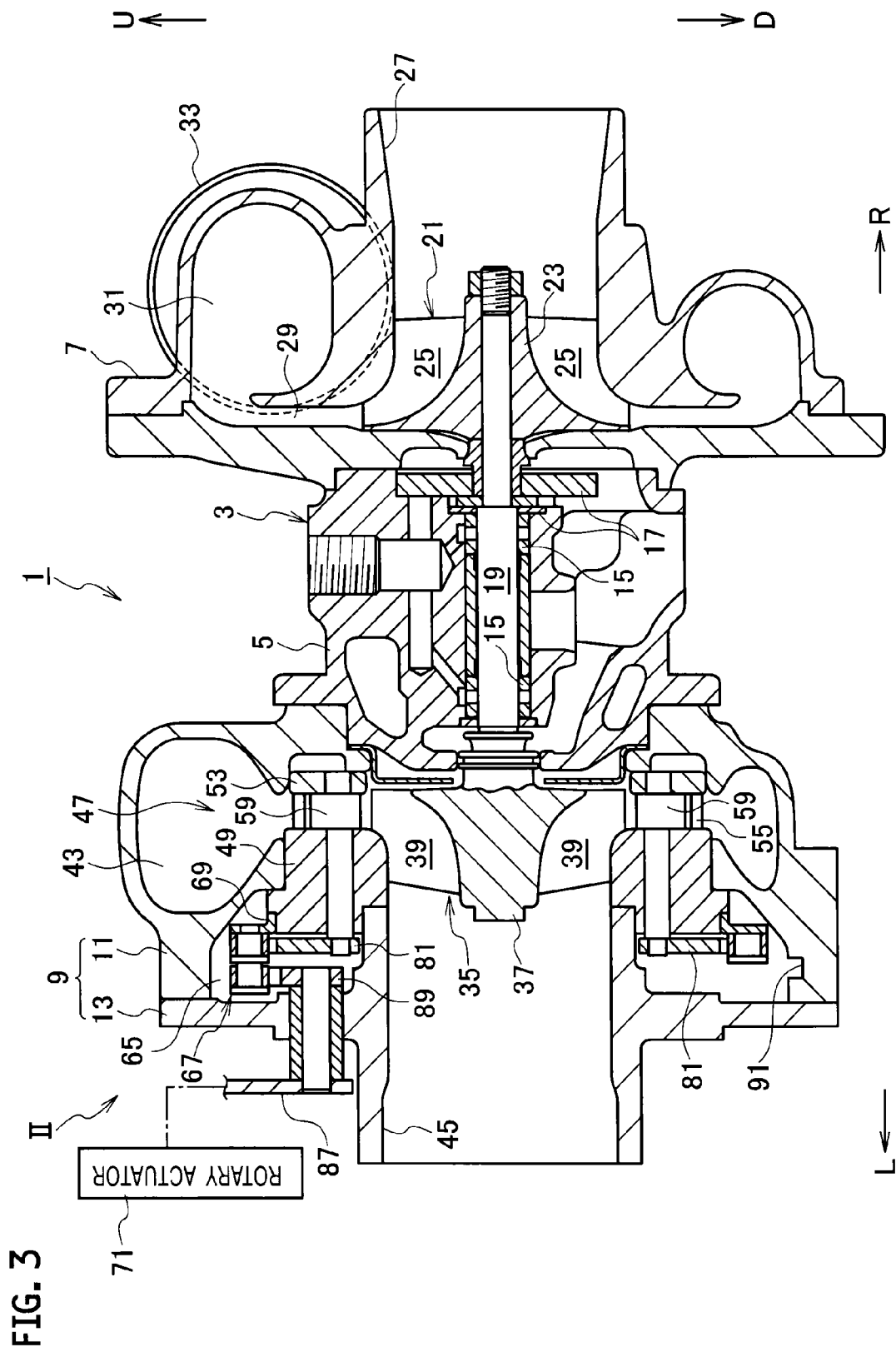
FIG. 3 is a front sectional view of a variable geometry system turbocharger according to an embodiment of the present invention.

As shown in FIG. 3, a variable geometry system turbocharger 1 according to the embodiment supercharges (compresses) air to be supplied to an engine (not shown) by using pressure energy of an exhaust gas from the engine.

The variable geometry system turbocharger 1 includes a turbocharger housing (a housing) 3 which is formed by casting or sintering using a given mold. The casting or sintering adopts publicly known processes and detailed descriptions thereof will be omitted herein. The turbocharger housing 3 includes a bearing housing 5 as a center housing, a compressor housing 7 as a first side housing provided on the right side of the bearing housing 5, and a turbine housing 9 as a second side housing provided on the left side of the bearing housing 5. In addition, the turbine housing 9 includes a turbine housing body 11 provided on the left side of the bearing housing 5, and a turbine housing cover 13 provided on the left side of the turbine housing body 11.

Multiple radial bearings 15 and multiple thrust bearings 17 are provided inside the bearing housing 5. In addition, a rotor shaft (a turbine shaft) 19 extending in a right-left direction is rotatably provided to the multiple bearings 15 and 17. In other words, the rotor shaft 19 is rotatably provided to the bearing housing 5 through the multiple bearings 15 and 17.

A compressor impeller 21 is provided inside the compressor housing 7 in such a way as to be rotatable about its shaft center (in other words, the shaft center of the rotor shaft 19). The compressor impeller 21 compresses the air by using a centrifugal force. In the meantime, the compressor impeller 21 includes a compressor disc (a compressor wheel) 23 integrally connected to a right end portion of the rotor shaft 19, and multiple compressor blades 25 provided on an outer peripheral surface (a hub surface) of the compressor disc 23 at regular intervals in its circumferential direction.

An air introduction port 27 for introducing the air is formed on an inlet side of the compressor impeller 21 in the compressor housing 7 (on the right side of the compressor housing 7). The air introduction port 27 is connected to an air cleaner (not shown) configured to clean up the air. Meanwhile, an annular diffuser passage 29 configured to boost the compressed air is formed on an outlet side of the compressor impeller 21 between the bearing housing 5 and the compressor housing 7. The diffuser passage 29 communicates with the air introduction port 27. In addition, a compressor scroll passage 31 in a scroll shape is formed inside the compressor housing 7. The compressor scroll passage 31 communicates with the diffuser passage 29. Moreover, an air discharge port 33 for discharging the compressed air is formed at an appropriate position in the compressor housing 7. The air discharge port 33 communicates with the compressor scroll passage 31 and is connected to an intake manifold (not shown) of the engine.

Figure 2:
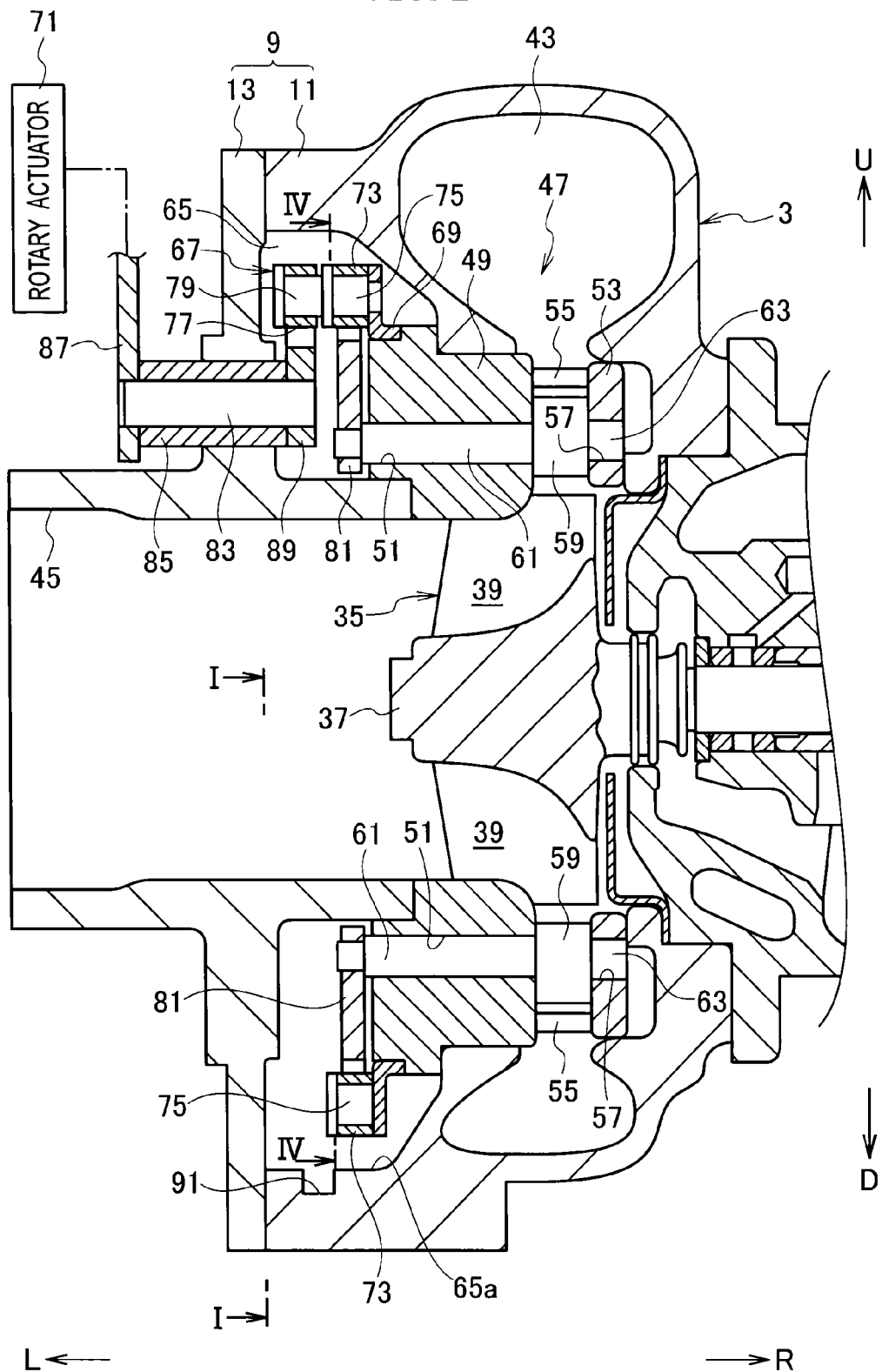
FIG. 2 is an enlarged view of a portion indicated with an arrow II in FIG. 3.

As shown in FIG. 2 and FIG. 3, inside the turbine housing 9, a turbine impeller 35 is provided rotatably about its shaft center (in other words, the shaft center of the rotor shaft 19). In other words, the turbine housing 9 rotatably houses the turbine impeller 35. The turbine impeller 35 generates a rotational force (rotational torque) by using the pressure energy of the exhaust gas. In the meantime, the turbine impeller 35 includes a turbine disc (a turbine wheel) 37 integrally provided at a left end portion of the rotor shaft 19, and multiple turbine blades 39 provided on an outer peripheral surface (a hub surface) of the turbine disc 37 at regular intervals in its circumferential direction.

A gas introduction port 41 (see FIG. 1) for introducing the exhaust gas is formed at an appropriate position in the turbine housing 9 (the turbine housing body 11). The gas introduction port 41 is connectable to an exhaust manifold (not shown) of the engine. In addition, a turbine scroll passage 43 in a scroll shape is formed inside the turbine housing 9 (the turbine housing body 11). The turbine scroll passage 43 communicates with the gas introduction port 41. Moreover, a gas discharge port 45 for discharging the exhaust gas is formed on an outlet side of the turbine impeller 35 in the turbine housing 9 (the turbine housing cover 13) (on the left side of the turbine housing 9). The gas discharge port 45 is connected to an exhaust emission control system (not shown) configured to clean up the exhaust gas.

A variable nozzle unit 47 is disposed inside the turbine housing 9. The variable nozzle unit 47 can change a passage area for (a flow rate of) the exhaust gas to be supplied to the turbine impeller 35 side.

As shown in FIG. 2, inside the turbine housing 9, a shroud ring 49 as a first base ring is provided concentrically with the turbine impeller 35. The shroud ring 49 is configured to cover outer edges of the multiple turbine blades 39. In addition, multiple first support holes 51 are formed to penetrate the shroud ring 49 and arranged at regular intervals in its circumferential direction.

At a position away from and opposed to the shroud ring 49 in an axial direction of the turbine impeller 35 (the right-left direction), a nozzle ring 53 as a second base ring is united in a concentric manner to the shroud ring 49 through multiple connection pins 55. In addition, multiple second support holes 57 are formed to penetrate the nozzle ring 53 and arranged at regular intervals in its circumferential direction in such a way as to match the multiple first support holes 51 in the shroud ring 49. Here, the multiple connection pins 55 have a function to define a clearance between a facing surface of the shroud ring 49 and a facing surface of the nozzle ring 53.

Multiple variable nozzles 59 are disposed between the facing surface of the shroud ring 49 and the facing surface of the nozzle ring 53 at regular intervals in the circumferential direction of the rings in such away as to surround the turbine impeller 35. Each variable nozzle 59 is rotatable in forward and reverse directions (opening and closing directions) about its shaft center which is parallel to the shaft center of the turbine impeller 35. Moreover, a first nozzle shaft 61 is formed integrally with a left side surface of each variable nozzle 59 (a side surface on one side in the axial direction). The first nozzle shaft 61 of each variable nozzle 59 is rotatably supported by the corresponding first support hole 51 in the shroud ring 49. Furthermore, a second nozzle shaft 63 is formed integrally with a right side surface of each variable nozzle 59 (a side surface on the other side in the axial direction), and concentrically with the first nozzle shaft 61. The second nozzle shaft 63 of each variable nozzle 59 is rotatably supported by the corresponding second support hole 57 in the nozzle ring 53. Here, each variable nozzle 59 is of a double-end-supported type provided with the first nozzle shaft 61 and the second nozzle shaft 63. Instead, each variable nozzle 59 may be formed into a cantilever type while omitting the second nozzle shaft 63.

The turbine housing body 11 includes a link chamber 65 which is formed on one side in the axial direction of the turbine impeller 35. The link chamber 65 is formed between the turbine housing body 11 and the turbine housing cover 13, in other words, on the left side (the opposite side from the facing surface) of the shroud ring 49 inside the turbine housing 9. The link chamber 65 includes an inner surface 65a that forms the link chamber 65. The inner surface 65a may be formed to have a sufficient clearance for avoiding interference with members to be housed in the link chamber 65. For example, the inner surface 65a is formed into an annular shape around the shaft center of the turbine impeller 35. As described later, the link chamber 65 includes a reservoir groove 91 as a reservoir recess to be formed at a portion of the inner wall 65a on a lower part side of the link chamber 65, a space inside the reservoir groove 91, and a reservoir area RA on the lower part side of the link chamber 65 for storing condensate water. The reservoir groove 91 is formed, for example, by cutting the inner wall 65a of the link chamber 65 while fixing the turbine housing body 11. A link mechanism (a rotation mechanism) 67 for synchronously rotating the multiple variable nozzles 59 in forward and reverse directions (opening and closing directions) is disposed inside the link chamber 65. The link mechanism 67 has publicly known configurations as disclosed in Japanese Patent Application Laid-Open Publications Nos. 2012-102660 and 2010-71142, for example.

Figure 4:
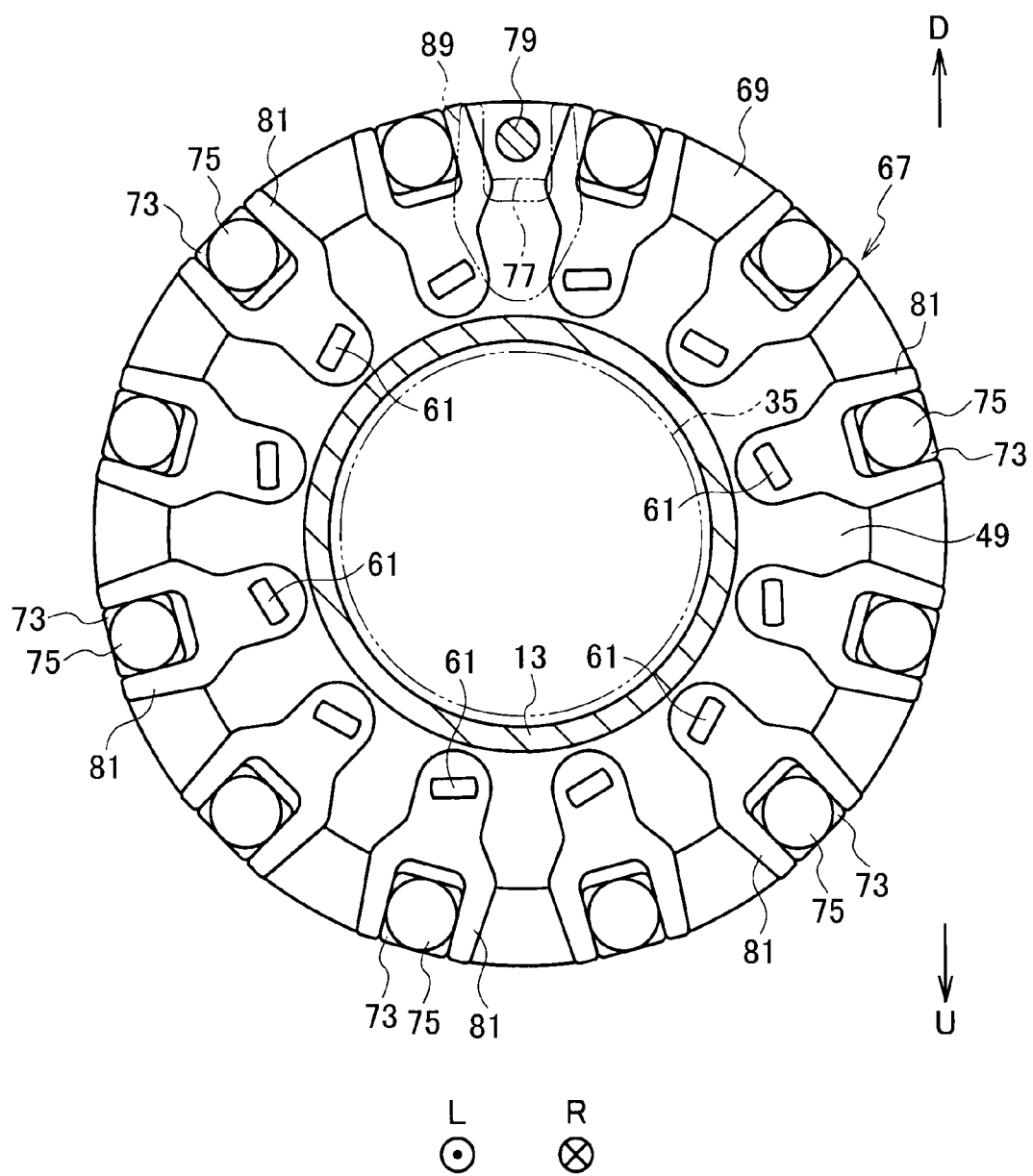
FIG. 4 is a view of a portion taken along the IV-IV line in FIG. 2.

A specific configuration of the link mechanism 67 will be described. As shown in FIG. 2 and FIG. 4, a drive ring 69 is provided on a left end side (the one end side in the axial direction) of an outer peripheral surface of the shroud ring 49 in such a way as to be rotatable about the shaft center of the turbine impeller 35. The drive ring 69 is rotated in the forward and reverse directions by the drive of a rotary actuator 71 such as an electric motor and a negative pressure cylinder. In the meantime, as many rectangular synchronization engagement joints (synchronization engagement portions) 73 as the variable nozzles 59 are disposed on a left side surface of the drive ring 69 at regular intervals in its circumferential direction through connection pins 75. A rectangular drive engagement joint (a drive engagement portion) 77 is provided at a portion in the circumferential direction on the left side surface of the drive ring 69 through a connection pin 79.

A nozzle link member 81 is integrally connected to a tip portion (a left end portion) of the first nozzle shaft 61 of each variable nozzle 59. A tip side portion of each nozzle link member 81 is forked and engaged in a nipping manner with the corresponding synchronization engagement joint 73. Meanwhile, a drive shaft 83 is provided to the turbine housing cover 13 through a bush 85 in such a way as to be rotatable about the shaft center which is parallel to the shaft center of the turbine impeller 35. Moreover, a left end portion (one end portion in the axial direction) of the drive shaft 83 is connected to the rotary actuator 71 through a power transmission mechanism 87, and a drive link member 89 is integrally connected to a right end portion (the other end portion in the axial direction) of the drive shaft 83. A tip side portion of the drive link member 89 is forked and engaged in a nipping manner with the drive engagement joint 77.

As shown in FIG. 1 and FIG. 2, the arc-shaped reservoir groove (an example of the reservoir recess) 91 for storing the condensate water is formed on the lowermost part (an example of the lower part) side of the link chamber 65 inside the turbine housing 9. The reservoir groove 91 has a rectangular cross-sectional shape. An inside space defined by the reservoir groove 91 is included in the reservoir area RA for storing the condensate water inside the link chamber 65. Dimensions (a width, a depth, a length, and the like) of the reservoir groove 91 are set such that, assuming a given state of condensation, a height position of a reference water surface WS of the condensate water stored in the reservoir area RA is lower than a height position of the lowermost part of the link mechanism 67. Here, the given state of condensation is that the water vapor contained in the exhaust gas retained in the entire region inside the link chamber 65 is completely condensed and liquefied (is completely condensed and rotated into the condensate water) after the engine stops its operation. Incidentally, in the variable geometry system turbocharger 1, the condensate water stored in the reservoir area RA evaporates when the engine resumes its operation.

Figure 5:
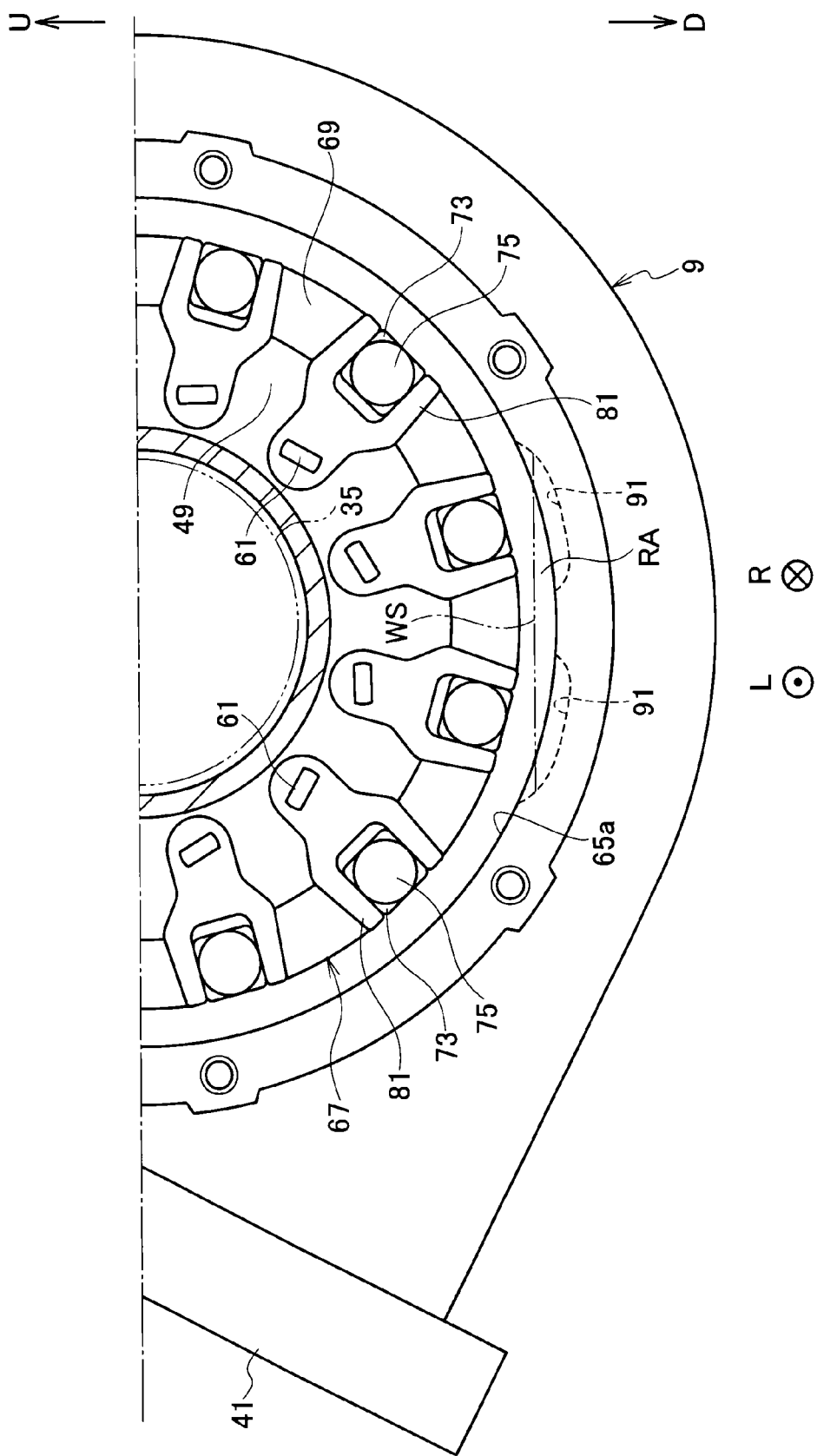
FIG. 5 is a view corresponding to FIG. 1, which is a view showing another aspect of a reservoir groove.

Here, multiple reservoir grooves 91 may be provided as shown in FIG. 5. A location to form each reservoir groove 91 is set depending on the orientation of the variable geometry system turbocharger 1 in the vehicle (i.e., its mounting angle to the vehicle). Such a location does not have to be on the lowermost part side of the link chamber 65 as long as it is on the lower part side of the link chamber 65 in this orientation. In the meantime, the cross-sectional shape of the reservoir groove 91 is not limited to the rectangular shape. The space inside the reservoir groove 91 may partially deviate from the reservoir area RA.

Meanwhile, intervals between the adjacent variable nozzles 59 do not have to be constant in consideration of shapes of the individual variable nozzles 59 and aerodynamic influences thereof. In such a case, the intervals of the adjacent first support holes 51 and the intervals of the adjacent second support holes 57 are also set so as to match the intervals of the variable nozzles 59. This is also the case with the intervals of the adjacent synchronization engagement joints 73.

Next, the operation and effect of the embodiment of the present invention will be described.

The exhaust gas introduced from the gas introduction port 41 flows from the inlet side to the outlet side of the turbine impeller 35 via the turbine scroll passage 43, whereby the rotational force (the rotational torque) is generated by using the pressure energy of the exhaust gas. Accordingly, the rotor shaft 19 and the compressor impeller 21 can be rotated integrally with the turbine impeller 35. Thus, it is possible to compress the air introduced from the air introduction port 27, to discharge the air from the air discharge port 33 via the diffuser passage 29 and the compressor scroll passage 31, and thereby to supercharge (compress) the air to be supplied to the engine.

While the variable geometry system turbocharger 1 is in operation, when the number of revolutions of the engine is in a high-revolution range and a flow rate of the exhaust gas is large, the multiple variable nozzles 59 are synchronously rotated in the forward direction (the opening direction) while operating the link mechanism 67 with the rotary actuator 71. Thus, the gas passage area (the throat area of the variable nozzles 59) for the exhaust gas to be supplied to the turbine impeller 35 side is increased, and a larger amount of the exhaust gas is supplied. On the other hand, when the number of revolutions of the engine is in a low-revolution range and the flow rate of the exhaust gas is small, the multiple variable nozzles 59 are synchronously rotated in the reverse direction (the closing direction) while operating the link mechanism 67 with the rotary actuator 71. Thus, the gas passage area for the exhaust gas to be supplied to the turbine impeller 35 side is decreased, whereby a flow velocity of the exhaust gas is increased and a sufficient workload of the turbine impeller 35 is ensured. This makes it possible to cause the turbine impeller 35 to generate the rotational force sufficiently and stably regardless of the variation in flow rate of the exhaust gas, and thereby to stably supercharge the air to be supplied to the engine.

Assuming the given state of condensation, the shape of the reservoir groove 91 is configured such that the height position of the reference water surface WS of the condensate water stored in the reservoir area RA is lower than the height position of the lowermost part of the link mechanism 67. In the meantime, the condensate water stored in the reservoir area RA evaporates when the engine resumes its operation.

Accordingly, even when the water vapor contained in the exhaust gas retained inside the link chamber 65 is rotated into the condensate water, the link mechanism 67 is kept from being partially immersed in the condensate water and getting caught by the frozen water. Thus, just by additionally providing the reservoir groove 91 as the constituent of the variable geometry system turbocharger 1, it is possible to sufficiently ensure the operational stability of the variable geometry system turbocharger 1 in cold weather without performing drainage maintenance.

As a consequence, according to the embodiment, it is possible to achieve simplification of the configuration of the variable geometry system turbocharger 1 by reducing the number of constituents of the variable geometry system turbocharger 1, and to improve ease of maintenance of the variable geometry system turbocharger 1 in cold weather.

Meanwhile, the reservoir groove 91 is formed by cutting the inner surface 65a of the link chamber 65. In other words, the reservoir groove 91 is formed after the formation of the turbine housing body 11 (the link chamber 65) by casting (sintering). The orientation (the mounting angle) of the variable geometry system turbocharger 1 in a vehicle changes depending on the type (specifications) of the vehicle. In the embodiment, the location to form the reservoir groove 91 can be set freely in accordance with such a change. In addition, since the reservoir groove 91 is formed by performing the cutting work, the reservoir groove 91 does not have to be formed in the process of casting (sintering) the turbine housing body 11. Specifically, the dimensions of the turbine housing body 11 can be set at minimum required values without considering the formation of the reservoir groove 91 as long as mechanical strength of the turbine housing body 11 is satisfied. The inner surface 65a of the link chamber 65 does not always have to be formed into the annular shape over the entire circumference as described previously. The inner surface 65a may form the space for housing the drive shaft 83 and the like at its portion in the circumferential direction as long as the reservoir groove 91 can be formed in the turbine housing body 11 by the cutting work. For example, the inner surface 65a may include a half-arc-shaped surface projecting (sagging) radially outward from the aforementioned annular surface. On the other hand, when the space for housing the drive shaft 83 and the like is not required, for instance, the inner surface 65a may be formed axisymmetrically.

The present invention is not limited to the descriptions of the above embodiment, but can be embodied in various other modes as described below, for example.

Specifically, instead of using the shroud ring 49 as the first base ring and using the nozzle ring 53 as the second base ring, the nozzle ring 53 may be used as the first base ring and the shroud ring 49 may be used as the second base ring. In this case, a link mechanism (not shown) is provided inside a link chamber (not shown) formed on the right side (the opposite side from the facing surface) of the nozzle ring 53 inside the turbine housing 9. Meanwhile, instead of forming the reservoir groove 91 on the lower part side of the link chamber 65 inside the turbine housing 9, multiple bottomed reservoir holes (not shown) for storing the condensate water may be formed thereon. The scope of right to be covered by the present invention is not limited by these embodiments.

What is claimed is:

1. A variable geometry system turbocharger configured to supercharge air to be supplied to an engine by using pressure energy of an exhaust gas from the engine, comprising:

a housing formed by casting or sintering, the housing including a link chamber formed on one side in an axial direction of a turbine impeller, and rotatably housing the turbine impeller; and a variable nozzle unit being disposed inside the housing, and being capable of changing a passage area for the exhaust gas to be supplied to the turbine impeller, wherein the variable nozzle unit includes a base ring provided inside the housing concentrically with the turbine impeller, and having a plurality of support holes formed to penetrate the base ring and arranged in a circumferential direction of the base ring, a plurality of variable nozzles disposed on the base ring and arranged in the circumferential direction in such a way as to surround the turbine impeller, each variable nozzle having a nozzle shaft formed integrally with a side surface of the variable nozzle on one side in the axial direction of the turbine impeller, and rotatable supported by the corresponding support hole in the base ring, and being rotatable about a shaft center of the nozzle shaft which is parallel to a shaft center of the turbine impeller, and a link mechanism disposed in the link chamber, connected to the nozzle shafts of the plurality of variable nozzles, and configured to synchronously rotate the plurality of variable nozzles, the link chamber includes a wall defined by an inner surface of the housing forming the link chamber, a reservoir recess formed by cutting the wall, and a reservoir area including a space inside the reservoir recess and designed to store a condensate water on a lower part side of the link chamber, the reservoir recess is formed such that, assuming that water vapor contained in the exhaust gas retained inside the link chamber is condensed and liquefied to form the condensate water after the engine stops an operation of the engine, a height position of a reference water surface of the condensate water stored in the reservoir area is lower than a height position of a lowermost part of the link mechanism, and the housing has no projection projecting outward for forming the reservoir recess, and has a thickness which enables at least the reservoir recess to be formed at any position of the inner surface.

2. The variable geometry system turbocharger according to claim 1, wherein the variable geometry system turbocharger is configured such that the condensate water stored in the reservoir area evaporates when the engine resumes the operation of the engine.

3. The variable geometry system turbocharger according to claim 1, wherein the reservoir recess is an arc-shaped reservoir groove.

4. The variable geometry system turbocharger according to claim 2, wherein the reservoir recess is an arc-shaped reservoir groove.

5. The variable geometry system turbocharger according to claim 1, wherein the wall forming the link chamber is formed into an annular shape around the shaft center of the turbine impeller.

6. The variable geometry system turbocharger according to claim 2, wherein the wall forming the link chamber is formed into an annular shape around the shaft center of the turbine impeller.

7. The variable geometry system turbocharger according to claim 3, wherein the wall forming the link chamber is formed into an annular shape around the shaft center of the turbine impeller.

8. The variable geometry system turbocharger according to claim 4, wherein the wall forming the link chamber is formed into an annular shape around the shaft center of the turbine impeller.

9. A method of manufacturing a housing for a variable geometry system turbocharger being configured to supercharge air to be supplied to an engine by using pressure energy of an exhaust gas from the engine, and including a variable nozzle unit capable of changing a passage area for the exhaust gas to be supplied to a turbine impeller, and the housing rotatably housing the turbine impeller and having a link chamber being formed on one side in an axial direction of the turbine impeller, housing a link mechanism configured to synchronously rotate a plurality of variable nozzles in the variable nozzle unit, and having a wall defined by an inner surface of the housing forming the link chamber, wherein the housing has no projection projecting outward for forming the reservoir recess, and has a thickness which enables at least the reservoir recess to be formed at any position of the inner surface, the method comprising:

forming the housing by casting or sintering; and forming the reservoir recess by cutting the wall, the reservoir recess defining an inside space included in a reservoir area designed to store a condensate water, wherein the reservoir recess is formed such that, assuming that water vapor contained in the exhaust gas retained inside the link chamber is condensed and liquefied after the engine stops an operation of the engine, a height position of a reference water surface of the condensate water stored in the reservoir area is lower than a height position of a lowermost part of the link mechanism.

10. The method of manufacturing a housing for a variable geometry system turbocharger according to claim 9, wherein the wall forming the link chamber is formed into an annular shape around a shaft center of the turbine impeller.

* * * * *